United States Patent
Hatke et al.

(10) Patent No.: US 6,239,187 B1
(45) Date of Patent: May 29, 2001

(54) POLYMER FOAMS

(75) Inventors: Wilfried Hatke, Hofheim; Freddy Helmer-Metzmann, Essenheim; Alexandra Jacobs, Niedernhausen, all of (DE)

(73) Assignee: Ticona GmbH, Frankfurt (DE)

( * ) Notice: Subject to any disclaimer, the term of this patent is extended or adjusted under 35 U.S.C. 154(b) by 0 days.

(21) Appl. No.: 09/066,356

(22) PCT Filed: Oct. 23, 1996

(86) PCT No.: PCT/EP96/04593

§ 371 Date: Sep. 10, 1998

§ 102(e) Date: Sep. 10, 1998

(87) PCT Pub. No.: WO97/16476

PCT Pub. Date: May 9, 1997

(30) Foreign Application Priority Data

Oct. 30, 1995 (DE) .............................. 195 40 356
May 17, 1996 (DE) .............................. 196 19 813

(51) Int. Cl.$^7$ ...................................... C08J 9/00
(52) U.S. Cl. .......................... 521/150; 521/140
(58) Field of Search ................... 521/150, 140

(56) References Cited

U.S. PATENT DOCUMENTS

| | | | |
|---|---|---|---|
| 4,496,669 | * | 1/1985 | Leach . |
| 4,598,102 | * | 7/1986 | Leach ................... 521/140 |
| 4,703,068 | * | 10/1987 | Leach ................... 521/140 |
| 4,708,969 | * | 11/1987 | Leach ................... 521/140 |
| 4,808,635 | * | 2/1989 | Nguyen .................. 521/150 |
| 4,959,395 | * | 9/1990 | Janda .................... 51/134 |
| 5,140,053 | * | 8/1992 | Yamamoto et al. .......... 521/142 |

OTHER PUBLICATIONS

Patent Abstracts of Japan identified as JP 061–45408–A, 1994.

* cited by examiner

*Primary Examiner*—Morton Foelak
(74) *Attorney, Agent, or Firm*—Frommer Lawrence & Haug

(57) ABSTRACT

The present invention relates to foams comprising cycloolefin copolymers. The foam of the invention comprises at least one cycloolefin copolymer which comprises from 0.1 to 100% by weight, based on the total mass of the cycloolefin copolymer, of polymerized units derived from one or more polycyclic olefins having one or more norbornene units and from 0 to 99% by weight, based on the total mass of the cycloolefin copolymer, of polymerized units derived from one or more acyclic olefins of the formula

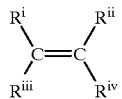

where $R^i$, $R^{ii}$, $R^{iii}$ and $R^{iv}$ are identical or different and are each a hydrogen atom, a linear, branched, saturated or unsaturated $C_1$–$C_{20}$-hydrocarbon radical or a $C_6$–$C_{18}$-aryl radical and from 0 to 99% by weight, based on the total mass of the cycloolefin copolymer, of polymerized units of one or more monocyclic olefins of the formula VIII (VIII)

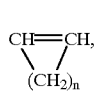

where n is a number from 2 to 10, and voids which can contain one or more gaseous substances.

24 Claims, 8 Drawing Sheets

POLYMER FOAMS

The present invention relates to foams comprising cycloolefin copolymers.

It is known that polymeric materials can be foamed by addition of solid, liquid or gaseous blowing agents. Blowing agents used are solid substances such as azo compounds, liquid blowing agents such as hydrocarbons, halogenated hydrocarbons and gaseous blowing agents such as nitrogen, It is likewise known that polymers such as polystyrene and polyolefins (e.g. polyethylene, polypropylene) can be processed into foams having a variety of uses.

The advantage of polymeric foam materials is their lower density compared with the unfoamed starting material and also their insulating or damping properties dependent on material and processing. Said materials have a maximum long-term use temperature of up to 100° C. (Handbook of polymeric foams, editors D. Klempner, K. C. Frisch, Hanser Verlag 1991, Ullmann's Encyclopedia of Industrial Chemistry), so that they are not suitable for use at higher temperature.

To obtain materials having a higher heat distortion resistance together with simultaneouslygood chemical and hydrolysis resistance, polymerscomprising cycloolefins have therefore been proposed. DD Patent 223 157 describes rigid foams of norbornene-ethylene copolymers having a long-term heat distortion resistance up to 410 K and resistance toward hot aggressive aqueous media.

EP-A 384 693 likewise describes foams of polymers comprising cycloolefins. These include structures which are produced by ring-opening polymerizatien and ones which are obtained using a catalyst comprising a vanadium compound and an organoaluminum compound. The latter are copolymers of the cyclic olefin with ethene. In various examples, heat distortion resistance up to 115° C. was able to be confirmed.

EP-A 427 567 discloses polyolefins which are employed as support layer in a parabolic antenna and can be foamed. Polyrners having polar modificatiors can be prepared by polymerization using metallocene catalysts.

It is an object of the present invention to provide a foam which, when used in high-temperature applications and also in applications where high temperatures can occur for a comparatively short time, has higher heat distortion resistances together with simultaneously good mechanical properties. A further object of the present invention is to provide an environmentally friendly and economical process for producing a foam.

The object of the present invention is achieved by a foam comprising cycloolefin copolymers. The present invention provides a foam comprising at least one cycloolefin copolymer which comprises polymerized units derived from at least one cyclic, in particular polycyclic, olefin and, if desired, at least one acyclic olefin. The term cycloolefin copolymer includes both cycloolefin copolymers and also cycloolefin homopolymers.

Figure 1:
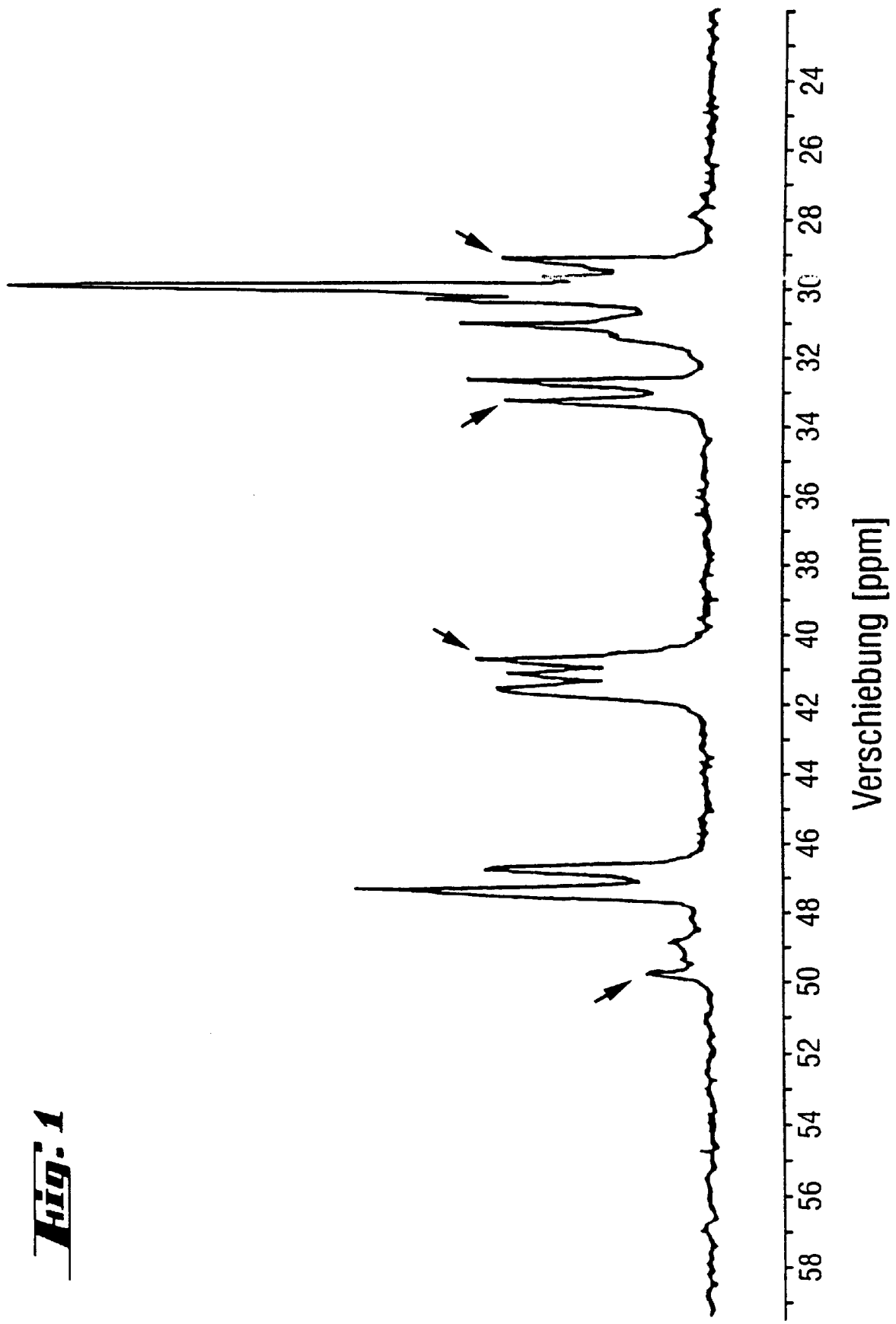
FIG. 1 shows a $^{13}$C-NMR spectrum of a cycloolefin copolymer of the type A having the microstructure characteristic for this type.

The foam of the invention is produced starting from a foamable material. This foamable material contains from 15 to 99.99% by weight, preferably from 50 to 99.99% by weight, particularly preferably from 80 to 99.99% by weight, of one or more cycloolefin copolymers.

The cyctoolefin copolymer present in the foamable material can comprise polymerized units which are derived from at least one cyclic, in particular polycyclic, olefin and at least one acyclic olefin. The cyclic, in particular polycyclic, olefins preferably have from 5 to 50, in particular from 5 to 30, carbon atoms. The acyclic olefins are preferably α-olefins having from 2 to 40 carbon atoms.

The proportion of polymerized units derived from cyclic, in particular polycyclic, olefins is from 0.1 to 100% by weight, preferably from 20 to 99% by weight, particularly preferably from 60 to 99% by weight, based on the total mass of the cycloolefin copolymer. The proportion of polymerized units derived from acyclic olefins is from 0 to 99.9% by weight, preferably from 5 to 80% by weight, particularly preferably from 10 to 60% by weight, based on the total mass of the cycloolefin copolymer.

The invention preferably provides a foam comprising at least one cycloolefin copolymer which comprises from 0.1 to 100% by weight, preferably from 20 to 99% by weight, particularly preferably from 60 to 99% by weight, based on the total mass of the cycloolefin copolymer, of polymerized units which are derived from one or more polycyclicolefins of the formulae I, II, III, IV, V or VI,

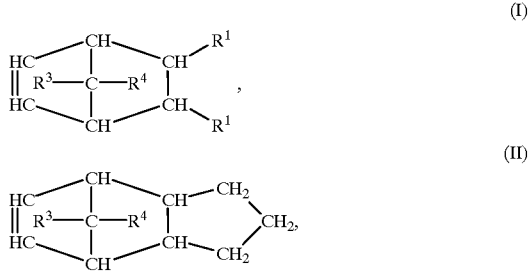

-continued

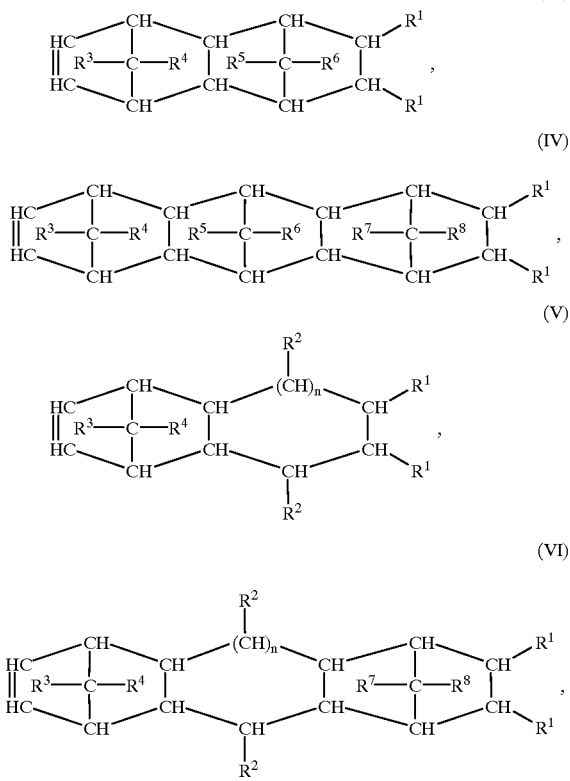

where $R^1$, $R^2$, $R^3$, $R^4$, $R^5$, $R^6$, $R^7$ and $R^8$ are identical or different and are each a hydrogen atom or a $C_1$–$C_{20}$-hydrocarbon radical such as a linear or branched $C_1$–$C_8$-alkyl radical, $C_6$–$C_{18}$-aryl radical, $C_7$–$C_{20}$-alkylenearyl radical, a cyclic or acyclic $C_2$–$C_{20}$-alkenyl radical, or form a saturated, unsaturated or aromatic ring, where the same radicals $R^1$ to $R^8$ in the various formulae I to VI can have different meanings, where n can assume values of from 0 to 5, and from 0 to 99.9% by weight, based on the total mass of the cycloolefin copolymer, of polymerized units which are derived from one or more acyclic olefins of the formula VII

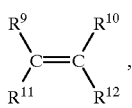

where $R^9$, $R^{10}$, $R^{11}$ and $R^{12}$ are identical or different and are each a hydrogen atom, a linear, branched, saturated or unsaturated $C_1$–$C_{20}$-hydrocarbon radical such as a $C_1$–$C_8$-salkyl radical or a $C_6$–$C_{18}$-aryl radical.

In addition, the cycloolefin copolymer present in the foam of the invention can contain from 0 to 99.9% by weight, based on the total mass of the cycloolefin copolymer, of polymerized units which are derived from one or more monocyclic olefins of the formula VIII

where n is a number from 2 to 10.

The foam can contain one or more voids which can contain one or more gaseous substances. The voids can be closed and open cells.

The cycloolefin copolymers present in the foam of the invention preferably comprise polymerized units derived from one or more polycyclic olefins, in particular polycyclic olefins of the formulae I and III, and polymerized units derived from one or more acydic olefins of the formula VII, in particular α-olefins having from 2 to 20 carbon atoms. Particular preference is given to cycloolefin copolymers comprising polymerized units derived from a polycyclic olefin of the formula I or III and an acyclic olefin of the formula VII. Preference is also given to terpolymers which comprise polymerized units derived from a polycyclic monoolefin of the formula I or III, an acyclic monoolefin of the formula VII and a cyclic or acyclic olefin containing at least two double bonds (polyene), in particular cyclic, preferably polycyclic, dienes such as norbomadiene or cyclic, particularly preferably polycyclic, alkenes which bear a $C_2$–$C_{20}$-alkenyl radical, for example vinyinorbomene.

The cycloolefin copolymers present in the foam of the invention preferably comprise olefins having a norbornene base structure, particularly preferably norbornene, tetracyclododecene and, if desired, vinylnorbornene or norbornadiene. Preference is also given to cycloolefin copolymers which comprise polymerized units derived from acyclic olefins having terminal double bonds such as α-olefins having from 2 to 20 carbon atoms, particulary preferably ethylene or propylene. Particular preference is given to norbomene-ethylene and tetracyclododecene-ethylene copolymers.

Among the terpolymers, particular preference is given to norbornene-vinylnorbornene-ethylene, norbomene-norbornadiene-ethylene, tetracyclododecene-vinyinorbornene-ethylene, tetracyclododecene-vinyltetracyclododecene-ethyleneter polymers. The proportion of polymerized units which are derived from a polyene, preferably vinyinorbomene or norbornadiene, is from 0 to 50% by weight, preferably from 0 to 20% by weight, and the proportion of the acyclic monoolefin of the formula VII is from 0 to 99% by weight, preferably from 5 to 80% by weight, particularly preferably from 10 to 60% by weight, based on the total mass of the cycloolefin copolymer. In the terpolymers described, the proportion of the polycyclic monoolefin is from 0.1 to 99% by weight, preferably from 20 to 95% by weight, particularly preferably from 40 to 90% by weight, based on the total mass of the cycloolefin copolymer.

The cycloolefin copolymers present in the foam of the invention can be crosslinked in order to fix the polymer framework. It is possible to carry out the crosslinking during the foaming process or subsequent to the foaming process. The crosslinking can be achieved, for example, by means of free-radical initiators, if desired with addition of a free-radical-polymerizable monomer, preferably a vinyl compound, e.g. styrene, or a crosslinker, e.g. divinylbenzene, or, for example, by means of electron beams.

The terpolymers comprising polymerized units which are derived from a polycyclic monoolefin, an acyclic monoolefin and a polyene can be crosslinked via the diolefinic units during the foaming process or else subsequent to the foaming process.

The cycloolefin copolymers present in the foam of the invention can be prepared at temperatures of from −78 to 200° C. and a pressure of from 0.01 to 200 bar, in the presence of one or more catalysts which comprise a transition metal compound and, if desired, a cocatalyst. Preference is given to transition metal compounds of group IV b of the Periodic Table of the Elements. Suitable transition metal compounds are metallocenes, in particular stereorigid metallocenes. Examples of catalyst systems which are suitable for preparing the cycloolefin copolymers suitable for the purposes of the invention are described, for example, in EP 407 870, EP 485 893, EP 503 422, which are hereby expressly incorporated by reference.

Examples for transition metal compounds used are:
rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichlorde,
1-silacyclobutylbis(1-indenyl)zirconium dichloride,
rac-diphenylsilylbis(1-indenyl)hafnium dichloride,
rac-phenylmethylsilylbis(1-indenyl)hafnium dichloride,
rac-diphenylsilylbis(1-indenyl)zirconium dichloride,
rac-ethylene-1,2-bis(1-indenyl)zirconium dichloride,
dimethylsily(9-fluorenyl)(cyclopentadienyl)zironium dichloride,
diphenylsilyl(9-fluorenyl)(cyclopentadienyl)zirconium dichlodde,
isopropylenebis(1-indenyl)zirronium dichloride,
diphenylmethylene(9-fluorenyl)cyclopentadienylzirconium dichloride,
isopropylene(9-fluorenyl)cycdopentadienyizirconium dichloride,
phenylmethylmethylene(9-fluorenyl)cyclopentadienylzirconium dichloride,
isopropylene(9-fluorenyl)(1-(3isopropyl)cyclopentadienyl)zirconium dichloride,
isopropylene(9-fluoreryl)(1-(3-methyl)cyclopentadienyl)zirconium dichloride,
diphenylmethylene(9-fluorenyl)(1-(3-methyl)cyclopentadienyl)zirconium dichloride,
methylphenylmethylene(9-fluorenyl)(1-(3-methyl)cyclopentadienyl)zirconium dichloride,
dimethylsilyl(9-fluorenyl)(1-(3-methyl)cyclopentadienyl)zirconium dichloride,
diphenylsilyl(9-fluorenyl)(1-(3-methyl)cyclopentadienyl)zirconium dichloride,
diphenylmethylene(9-fluorenyl)(1-(3-tert-butyl)cyclopentadienyl)zirconium dichloride,
isopropylene(9-fluorenyl)(1-(3-tert-butyl)cyclopentadienyl)zirconium dichloride,
isopropylene(cyclopentadienyl)(1-indenyl)zirconium dichloride,
diphenylcarbonyl(cyclopentadienyl)(1-indenyl)zirconium dichloride,
dimethylsilyl(cyclopentadienyl)(1-indenyl)zirconium dichloride,
isopropylene(methylcyclopentadienyl)(1-indenyl)zirconium dichloride,
4-($\eta^5$-cyclopentadienyl)-4,7,7-trimethyl-($\eta^5$-4,5,6,7-tetrahydroindenyl]-zirconium dichloride,
[4-($\eta^5$-cyclopentadienyl)-4,7,7-triphenyl-($\eta^5$-4,5,6,7-tetrahydroindenyl)]-zirconium dichloride,
[4-($\eta^5$-cyclopentadienyl)-4,7-dimethyl-7-phenyl-($\eta^5$-4,5,6,7-tetrahydroindenyl)]-zirconium dichloride,
[4-($\eta^5$-3'-tert-butylcyclopentadienyl)-4,7,7-triphenyl-($\eta^5$-4,5,6,7-tetrahydroindenyl)]zirconium dichloride,
[4-($\eta^5$-3'-tert-butylcyclopentadienyl)-4,7-dimethyl-7-phenyl-($\eta^5$-4,5,6,7-tetrahydroindenyl)]zirconium dichloride,
[4-($\eta^5$-3'-methylcyclopentadienyl)-4,7,7-trimethyl-($\eta^5$-4,5,6,7-tetrahydroindenyl)]zirconium dichloride,
[4-($\eta^5$-3'-methyleyclopentadienyl)-4,7,7-triphenyl-($\eta^5$-4,5,6,7-tetrahydroindenyl)]zirconium dichloride,
[4-($\eta^5$-3'-methylcyclopentadienyl)-4,7-dimethyl-7-phenyl-($\eta^5$-4,5,6,7-tetrahydroindenyl)]zirconium dichloride,
[4-($\eta^5$-3'-isopropylcyclopentadienyl)-4,7,7-trimethyl-($\eta^5$-4,5,6,7-tetrahydroindenyl)]zirconium dichloride,
[4-($\eta^5$-3'-isopropylcyclopentadienyl)-4,7,7-triphenyl-($\eta^5$-4,5,6,7-tetrahydroindenyl)]zirconium dichloride,
[4-($\eta^5$-3'-isopropylcyclopentadienyl)-4,7-dimethyl-7-phenyl-($\eta^5$-4,5,6,7-tetrahydroindenyl)]zirconium dichloride,
[4-($\eta^5$-cyclopentadienyl)($\eta^5$-4,5-tetrahydropentalene)]zirconium dichloride,
[4-($\eta^5$-cyclopentadienyl)-4-methyl-($\eta^5$-4,5-tetrahydropentalene)]zirconium dichloride,
[4-($\eta^5$-cyclopentadienyl)-4-phenyl-($\eta^5$-4,5-tetrahydropentalene)]zirconium dichloride,
[4-($\eta^5$-cyclopentadienyl)-4-phenyl-($\eta^5$-4,5-tetrahydropentalene)]zirconium dichloride,
[4-($\eta^5$-3'-methylcyclopentadienyl)($\eta^5$-4,5-tetrahydropentalene)]zirconium dichloride,
[4-($\eta^5$-3'-isopropylcyclopentadienyl)($\eta^5$-4,5-tetrahydropentalene)]zirconium dichloride,
[4-($\eta^5$-3'-benzyl-cyclopentadienyl)($\eta^5$-4,5-tetrahydropentalene)]zirconium dichloride,
[4-($\eta^5$-1-indenyl)($\eta^5$-4,5-tetrahydropentalene)]zirconium dichloride,
[4-($\eta^5$-9-fluorenyl)($\eta^5$-4,5-tetrahydropentalene)]zirconium dichloride.

The cycloolefin copolymers present in the foam of the invention have a glass transition temperature of from 50 to 300° C., preferably a glass transition temperature of from 70 to 250° C. The glass transition temperatures are determined by means of DSC (Differential Scanning Calorimetry) at a heating rate of 20° C./min, The cycloolefin copolymers which are particularly suitable for the purposes of the invention have viscosity numbers of from 50 to 300 cm$^3$/g, in particular from 60 to 200 cm$^3$/g. The viscosity numbers are determined in decalin at 135° C. in accordance with DIN 53 728.

The important parameters for the preparation and properties of the foam, for example glass transition temperature, molar mass and rheological properties, can be adjusted by the selection of the synthesis conditions and the catalyst.

The preparation of polar-modified polymers which can contain, inter alia, cycloolefins using metallocenes and the possibility of foaming these polymers are mentioned in EP-A 427 567.

Properties such as the heat distortion resistance and the mechanical properties are critical for foams. A material having a high stiffness makes possible the production of shaped parts of low thickness and thus leads to a saving of material.

Applications in the construction sector require, for prescribed external outlines or for a restricted utilizable area, the use of stable components. Owing to its high stiffness at low density, the foam of the invention offers the opportunity of using very thin components which leads to a saving in weight and an enlargement of the utilizable area. The stiffness of the component is determined by the modulus of elasticity of the material. A high modulus of elasticity is required to avoid irreversible deformation under stress. It has been found that a cycloolefin copolymer having the specific microstructure is particularly suitable for producing the foam of the invention.

A cycloolefin copolymer of the type A which is prepared by the process described in EP-A 485 693 has a specific microstructure. It is particularly suitable as starting material for the foam of the invention which has both a high heat distortion resistance and an increased stiffness. The cycloolefin copolymer present in the foam of the invention can be a cycloolefin copolymer of the type A which has said specific microstructure.

The specific microstructure is distinguished by a relatively high stereotacticity in respect of the cycloolefins. The resulting preferred conformation of the chain prevents the chains from sliding past one another in the case of small elongations. This in turn gives a higher stiffness (a higher modulus of elasticity) as material property.

The definition of stiffness used hereinafter is as follows: the cycloolefin copolymer of the type A has an intrinsic modulus of elasticity which depends on the glass transition temperature of the cycloolefin copolymer (type A) in accordance with:

$$E_i = (0.0025 \text{ [GPa/}° \text{C.]} \times T_g [° \text{C.}] + B [\text{GPa}]$$

where B=2.93 to 3.19.

The $E_i$ value serves as possible confirmation of the characteristic microstructure of the cycloolefin copolymer.

A further confirmation of this microstructure is the $^{13}$C-NMR spectrum. The specific microstructure results in some characteristic peaks in the $^{13}$C-NMR spectrum. The $^{13}$C spectrum of the cycloolefin copolymer of the type A having the stiffness described for the invention has, among other features, a characteristic peak at 40.8 ppm.

The selection of the catalyst and the reaction conditions is critical to achieving the characteristic microstructure, Examples of suitable catalyst systems for preparing a cycloolefin copolymer of the type A are methylaluminoxane/diphenylmethylene(cyclopentadienyl)(9-fluorenyl)zirconium dichloride or methylaluminoxane/isopropylene(cyclopentadienyl)(9-fluorenyl)zirconium dichloride. However, other catalyst systems are also suitable as long as the characteristic microstructure is obtained.

Confirmation of the microstructure via the mechanical properties of the polymer is carded out in a tensile test. It is important here that the specimen contains not more than 2% by weight of additives or other polymers and is sufficiently thick and fully isotropic, i.e. has no preferential orientation of the COC chains. If too many extraneous materials are present, the intrinsictensile E modulus measured is not that of the cycloolefin copolymer but a property of the mixture. The intrinsic modulus of elasticity $E_i$ is measured at very low elongations (less than 0.1%, preferably from 0.03 to 0.05%). The modulus of elasticity should be determined on specimens having a minimum thickness of 1 mm, Since orientation of the samples could increase the tensile E modulus values, these have to be isotropic. Non-oriented injection moldings can be produced from the CCC and used as $E_i$ test specimens. The intrinsic E modulus, $E_i$, is a modulus of elasticity which is determined in accordance with DIN 53 547 at an elongation of <0.1%.

The intrinsic tensile E modulus of a cycloolefin copolymer is determined by the microstructure of the chains, similarly to the way in which the tacticity of other polymers influences their mechanical properties. For the same $T_g$, which indicates approximately equal molar proportions of the monomers, the cycloolefin copolymers present in the foam of the invention have a higher intrinsic tensile E modulus.

For applications in which flexural stresses are high in the short or longer term, materials having a comparatively good flexibility are required. A cycloolefin copolymer of the type B which is prepared by the process described in EP-A 407 870 has, owing to a specific microstructure, an improved flexibility. It has been found that a cycloolefin copolymer of the type B is particularly suitable as starting material for foams which have both a higher heat resistance and an increased flexibility. The cycloolefin copolymer present in the foam of the invention can be a cycloolefin copolymer of the type B which has the specific microstructure mentioned.

According to nuclear magnetic resonance examination, this microstructure is tactic in respect of the microstructure of the blocks in the polymer chain. The type of tacticity is not known. The microstructure is distinguished by a relatively high isotacticity in respect of the cycloolefins. This leads to a higher looping density and allows mechanical relaxation which is reflected macroscopically in a reduction in brittleness (=higher ductility). Mechanical energy can be distributed over greater volumes; the material does not tear as quickly. The cycloolefin copolymer of the type B should display a secondary softening below the glass transition temperature (Tg), so that the mechanical tan δ of the cycloolefin copolymer at 30° C. below the glass transition temperature is at least 0.014. This tan δ value serves as a possible confirmation of the characteristic microstructure of the cycloolefin copolymer.

A further confirmation of this microstructure is the $^{13}$C-NMR spectrum. The $^{13}$C-NMR spectrum of the cycloolefin copolymer of the type B has, apart from other differences, a characteristic peak at 42.2 ppm.

The selection of the catalyst and the reaction conditions is critical for achieving the microstructure of the invention. Examples of suitable catalyst systems are methylaluminoxane/isopropylene(cyclopentadienyl)(1-indenyl)zirconium dichloride or methylaluminoxane/isopropylenebis(1-indenyl)zirconium dichloride. However, other catalyst systems are also suitable as long as the characteristic microstructure is obtained.

The characteristic microstructure can be confirmed either via the temperature dependence of the mechanical tan δ or the $^{13}$C-NMR spectrum. The temperature dependence of the mechanical tan δ (also known as mechanical loss factor) gives information about mechanical relaxation processes, i.e. main softening points (glass transitions) and secondary softenings. The mechanical tan δ can be determined by a series of vibrational methods, e.g. torsional pendulum or cyclic load studies (cf. Ch. Fritzsche, "Torsionsschwingungsmessungen an Kunststoffen" in Kunststoffe-Plastics, Volume 21, Issue No. 2, (1974) pages 17–24) The measurement of the dielectricloss factor is less informative for determining mechanical relaxations in polyolefins, since they have too little polarity. The vibrational examination has to be carried out on nonoriented specimens. Non-oriented injection-molded bars can be produced from the polymer and these can serve as test specimens. If a sample contains additives in amounts of >2% by weight, the $^{13}$C-NMR spectra should be measured instead of the mechanical tan δ.

A characteristic of the COCs having the specific microstructure relevant to the invention is that the mechanical tan δ has values of >0.014, preferably >0.016, at a temperature 30° C. below the glass transition temperature. Values of >0.1 are no longer realistic.

A cycloolefin copolymer of the type C which is prepared by the process described in EP-A 503 422 has partial crystallinity. These partially crystalline cycloolefin copolymers are likewise suitable for producing foams.

It has been shown by means of $^{13}$C-NMR spectra that the partially crystalline cycloolefin copolymers are clearly different in terms of their microstructure from the previously descbed cycloolefin copolymers prepared using other metallocene catalysts. This difference could be based on the fact that the metallocene catalysts used here polymerize alternately owing to their specific symmetry. It is assumed that the cycloolefin copolymers prepared in this way comprise tactic, alternating cycloolefina-olefin sequences, Partial crystallinitycan be confirmed by DSC (Diffential Scanning Calorimetry). Owing to the high melting point, it could be concluded that the partial crystallinity is attributable not to ethylene sequences, but presumably to the alternating structure of the cycloolefin copolymer. The melting point of the partially crystalline cycloolefin copolymer of the type C is above 200° C.

The selection of the catalyst and the polymerization conditions is critical for the preparation of the partially crystalline cycloolefin copolymers of the type C. Examples of suitable catalyst systems are methylaluminoxane/isopropylene(9-fluorenyl)(1-(3-methyl)cyclopentadienyl) zirconium dichloride and methylaluminoxane/isopropylene (9-fluorenyl)(1-(3-isopropyl)cyclopentadienyl) zirconiumdichloride. However, other catalyst systems are also suitable as long as the characteristic microstructure is obtained.

The advantage of the cycloolefin copolymer of the type C is that the abovementioned microstructure leads to a partially crystalline material. This material is very well suited for the preparation of a foam of the invention. The partial crystallinity of the cycloolefin copolymer makes possible additional fixing of the foam framework and thus an improvement of the thermal and mechanical properties, e.g. the chemical resistance and the barrier properties.

The foam of the invention can comprise, apart from at least one cycloolefin copolymer, one or more further polymers. Suitable polymers are those which, owing to their structure and their specific properties, are compatible or else incompatible with the cycloolefin copolymer present. Examples of such polymers are polyethylene, polypropylene,ethylene-vinylacetate copolymers, polymethyl methacrylate, polyurethane, polytetrafluoroethylene. One or more, for example, of these polymers can be present in the foamable material in a proportion of from 0 to 95% by weight, preferably from 0 to 50% by weight, particularly preferably from 0 to 10% by weight. An advantage of the mixtures is that the addition of a further polymer influences the cell formation of the foam and the properties of the cell walls and thus the properties of the foam of the invention.

To carry out the foaming, the polymer is treated with a blowing agent. The blowing agent is present in the foamable material in proportions of from 0.01 to 20% by weight, preferably from 0.1 to 10% by weight For the purposes of the present inventions a blowing agent is a substance which liberates gases by decomposition, reaction or vaporization, these gases leading to a foaming of the material, or else a gas which effects foaming of the material by expansion, The blowing agent can be a solid, a liquid, a gas or a combination of these substances.

In addition, the foamable material can contain a nucleating agent in proportions of from 0.01 to 20% by weight, preferably from 0.1 to 10% by weight. The nucleating agent can be identical to the blowing agent.

Further additives can be present in the foamable material in proportions of from 0.01 to 80% by weight, preferably from 0.05 to 50% by weight, particularly preferably from 0.05 to 20% by weight These additives can be: heat stabilizers, weathering stabilizers, light and UV stabilizers, foaming aids, opacification inhibitors, antistatics, lubricants, anti-adhesion agents, natural or synthetic oils, waxes, surface-active substances, dyes, pigments, organic or inorganic fillers, as long as these additives do not have an adverse effect on the requirements of the present invention.

The invention also provides a foam in which a certain proportion of the cycloolefin copolymer is replaced by the same proportion by weight of a foreign polymer and the proportion by weight is from 0 to 90% by weight, preferably from 0 to 50% by weight; the foreign polymer used is at least one polymer such as polypropylene, polypropylene copolymer or polyethylene.

The foam of the invention is produced starting from a foamable material. Apart from one or more of the above-described cycloolefin copolymers, which can be of the type A, B or C, or else combinations of these cycloolefin copolymers, and, if desired, one or more foreign polymers, the foamable material from which the foam of the invention is produced contains a blowing agent.

Blowing agents which liberate gases by decomposition or reaction, these gases leading to foaming of the foamable material, are described as chemical blowing agents in contrast to the physical blowing agents in which the foaming is achieved by vaporization of a liquid or by expansion of a gas.

The chemical blowing agents include organic and inorganic blowing agents. Examples of inorganic blowing agents are carbonates such as sodium hydrogen carbonate, ammonium carbonate, ammonium hydrogencarbonate, nitrites, azides, sodium borohydride. Examples of organic blowing agents are azo compounds such as azodicarbonamide, barium azodicarboxylate, hydrazine derivatives such as 4,4'-oxybis(benzenesulfonyl hydrazide), diphenyl sulfone 3,3'-di(sulfonyl hydrazide), trihydrazinotriazine, semicarbazides such as p-toluenesulfonyl semicarbazide, tetrazoles such as 5-phenyltetrazole, benzoxazines such as isatoic anhydride.

The decomposition or reaction temperature, the amount of gas formed, the decomposition or reaction rate and the type of decomposition or reaction residues are important factors in the selection of 3 suitable chemical blowing agent.

It is also possible to add to the foamable material additional auxiliaries, e.g. kickers and nucleating agents, which lower the decomposition temperature of the blowing agent, increase the amount of gas formed and the rate of the decomposition or reaction or promote the initiation of gas bubbles and thus influence foam formation or the foam structure. These include, inter alia, urea, polyols, amines, metal-containing compounds such as zinc oxide, acids such as oxalic acid, succinic acid, citric acid.

Physical blowing agents include liquids and gases. Examples of physical blowing agents are saturated, unsaturated or cyclic hydrocarbons, halogenated hydrocarbons, alcohols, water, nitrogen and carbon dioxide and mixtures of these blowing agents. Owing to their low boiling points, preference is given to blowing agents such as methane, ethane, ethene, propane, propene, n-butane, 1-butene, 2-butene, isobutane, isobutene, n-pentane, isopentane, 2,2- dimethylpropene, cyclopentane. Other blowing agents such as water, nitrogen, carbon dioxide are more difficult to handle, e.g. in terms of metering, but they offer ecological advantages and are, for example, also advantageous in view of their nonflammability.

In combination with physical blowing agents, it is likewise possible to use auxiliaries such as nucleating agents. Preferred nucleating agents are water, nitrogen, talc, chalk, sodium, carbonate, sodium hydrogen carbonate and/or citric acid.

The foam of the invention can be produced by use of one or more blowing agents or by use of a combination of one or more blowing agents and one or more auxiliaries, The auxiliary which, for example, acts as nudeating agent can be identical to a blowing agent. Therefore, reference will hereinafter be made to a blowing agent composition, This term includes all systems which comprise one or more blowing agents or a combination of one or more blowing agents and one or more auxiliaries.

The blowing agent composition can be mixed in a known manner with the polymer to be foamed. Solid blowing agent compositions can here be mixed into the cycloolefin copolymer in the form of an unmodified powder, a surface-treated powder, as blowing agent paste, i.e. usually in a plasticizer and, if desired, a dispersant as liquid carrier, in the form of a blowing agent dispersion, as powder concentrate in the polymer to be foamed later as carrier, as blowing agent concentrate (masterbatch) in granule form in a polymeric carrier or else as blowing agent formulation in rod, flake or granule form with a low-melting wax as binder. Liquid blowing agent compositions can be mixed in in liquid form, blowing agent compositions which are gaseous at atmospheric pressure can be mixed in in gaseous or else in liquefied form.

Homogeneous incorporation can be carried out above the softening temperature of the polymer, for example in a kneader or extruder. When using a chemical blowing agent, the temperature during this incorporation step can be below the decomposition or reaction temperature of the blowing agent, so that the decomposition or reaction occurs only subsequently at higher temperature, or else it can already be above the decomposition or reaction temperature of the blowing agent. The gas which is formed and/or expands when use is made of chemical and physical blowing agent compositions is first held in the polymer melt and the expansion and foaming occur against lower pressure, preferably against atmospheric pressure.

It has been found that cycloolefin copolymers are very well suited to the production of the foams of the invention. It has been found that the blowing agents can be incorporated very readily into the melt. This is possibly attributable to the good flowability of the material which can be adjusted by means of the monomer ratios, the molar mass of the polymer and the selection of the metallocene catalyst. Foaming to give the foams of the invention can be carried out by means of extrusion, injection molding, blow molding, foaming in a mold, etc., using the above-described blowing agent compositions. This can be followed by further processing steps such as calendering, deep drawing, stretching, thermoforming, etc. Accordingly, the foams of the invention are very readily obtained by established methods.

It has now been found that the cycloolefin copolymers present in the foamable material have a very narrow temperature window between solidified or viscous melt and fluid melt. This enables the foamable material to be conveyed in the molten state at high throughputs, but it solidifies very quickly after exit from the die of the extruder. The high melt stability achieved in this way leads to the vaporizing blowing agent not being able to escape, but being utilized very effectively for foaming the material.

Likewise, prefoamed beads or particles can be produced from the foamable material and these beads or particles can subsequently, for example by pressing together and welding, e.g. using hot air or steam, be made into a molding of any desired shape and size.

The processing to give foams having the above-described properties requires matching parameters such as temperature, molar mass and rheological properties.

Depending on the processing conditions and the blowing agent compositions used, foams of the invention having different hardnesses and densities can be produced. The foams of the invention can have a density of from 5 to 900 $kg/m^3$, preferably from 10 to 900 $kg/M^3$, and a compressive strength of from 0.01 to 100 MPa, preferably from 0.1 to 100 MPa. The density distribution over the respective shaped part can be uniform or nonuniform. The foams of the invention can be flexible, semirigid to rigid, preferably semirigid to rigid.

The foam of the invention contains cells, i.e. voids. A distinction is made between closed and open cells. In the case of closed cells, the cell walls enclosing the void consist of unperforated plastic or plastic which is in another way impermeable to a medium. In the case of open cells, at least two of these cell walls enclosing the void have openings, so that exchange of material is possible between neighboring cells. The foams of the invention can have different proportions of open and closed cells. It is thus possible to produce open-pored and closed-pored foams. The foams of the invention can have between 0 and 100% by volume of closed cells.

Preference is given to producing closed-pored foams. The foam of the invention therefore preferably has a proportion of closed cells of more than 30% by volume, particularly preferably more than 50% by volume. These foams display the high heat distortion resistance and excellent mechanical properties described. In addition, it has been found that the foam of the invention has good barrier properties such as a low water absorption and low thermal conductivity. Owing to the structure of the polymeric starting material, the foam of the invention has an excellent thermal aging behavior.

The fine foam structure which occurs particularly in the case of the novel closed-pored foams of different density under suitable processing conditions increases refraction of light. The material appears white and is significantly more resistant to light Light-sensitive substances surrounded by the foam of the invention are protected from light. Owing to the smooth, glossy surface in combination with the thermal and mechanical properties, the foams of the invention are particularly well suited for various applications in the building and automobile sector, as construction parts and decorative parts and in the packaging and insulation areas.

The foams of the invention can be employed in the form of extruded shaped parts such as plates, films, hoses, tubes, rods, bands, profiles, in the form of blow-molded parts such as plates, films, hoses, tubes, containers, in the form of injection-molded parts or mold-foamed parts of any shape and size, in the form of deep-drawn films, containers and cups.

In addition, the foams of the invention can be employed in the form of parts which are produced by, for example, welding together of prefoamed beads or particles. Shaped parts of any shape and size can be produced in this way.

The foam of the invention is very suitable for composite materials containing other polymers such as polyethylene or polypropylene. The composite materials comprise, for example, various layers of two or more polymers. An example of such a composite material is a shaped part comprising the foam of the invention and a covering layer of another material such as polyethylene or polypropylene. The composite materials of the invention can be produced, for example, by coextrusion, by multicomponent injection molding or by subsequent coating of a shaped part.

The applications of the foams of the invention can be, for example, in the automobile, building and construction sectors, erg. for construction components, decorative components, also in the field of transport and packaging, e.g. in the form of tanks, containers, lines, packaging material, packaging and containers for foodstuffs and beverages, in the field of insulation, e.g. as material for heat, sound, shock and electrical insulation, e.g. in the form of components, packaging material, housings for instruments or containers, sheaths for cables and lines. Examples of such applications in the automobile sector are dashboards door interiors, sunroofs, head rests, visors, flaps, covers, and also walls, casings, coverings for trailer superstructures, mobile homes, etc.

A further application of the foams of the invention in the construction sector is their use as walls for decorative purposes, partitions, coverings, etc. The foams of the invention can be used as insulation materials, e.g. for the thermal insulation of reactors, containers, feed and discharge lines, etc., in hot and warm water supply and also for the insulation of refrigeration appliances, refrigerators, transport containers and refrigerated vehicles. Here, the foams of the invention can be used in the form of plates, films, shaped bodies and half shells. In addition, there is the possibility of combining container, line or the like with the insulation layer, by, for example, simultaneously foaming the container during its production by blow molding so that the wall of the container or line is simultaneously an insulation layer. The advantage of such a combination is firstly the saving of a processing step for the separate foaming of the insulation material and a further processing step for joining container and insulation layer. Secondly, container and insulation material are made of the same polymer so that a complicated separation after use becomes unnecessary and recycling is easy. The foam of the invention has been found to be particularly suitable for such an application since it has a high resistance to warm and hot water and, owing to its chemical structure, does not absorb water. In addition, the foam of the invention presents no health problems and is thus also suitable for use in the foodstuffs and beverages sector.

The foam described in the present invention is a material which is easily obtainable and can be readily produced using known methods, has properties which can be matched to the application over a wide range and is thus economically advantageous. At the same time, this material has ecological advantages since the starting material is a polyolefin, i.e. a pure hydrocarbon, and the foam of the invention can thus be recycled without presenting any concerns. An advantage of the foam of the invention is its very high and adjustable heat distortion resistance which distinguishes this material from other polymeric foams. Additional advantages are the excellent, likewise variable mechanical properties and the high chemical and hydrolysis resistance, particularly in comparison with polyurethane and polycarbonate foams.

For use in specific application areas, it is particularly advantageous that the foam of the invention also has a good barrier action such as low absorption of water and a good barrier action against water vapor, and an excellent thermal aging behavior. For use as thermal insulation material, the low thermal conductivity of the foam of the invention is particularly advantageous.

The present invention is illustrated by means of a drawing and the examples below.

DRAWING

The drawing comprises FIG. 1 to FIG. 9.

FIG. 1 shows a $^{13}$C-NMR spectrum of a cycloolefin copolymer of the type A having the microstructure characteristic for this type.

Figure 2:
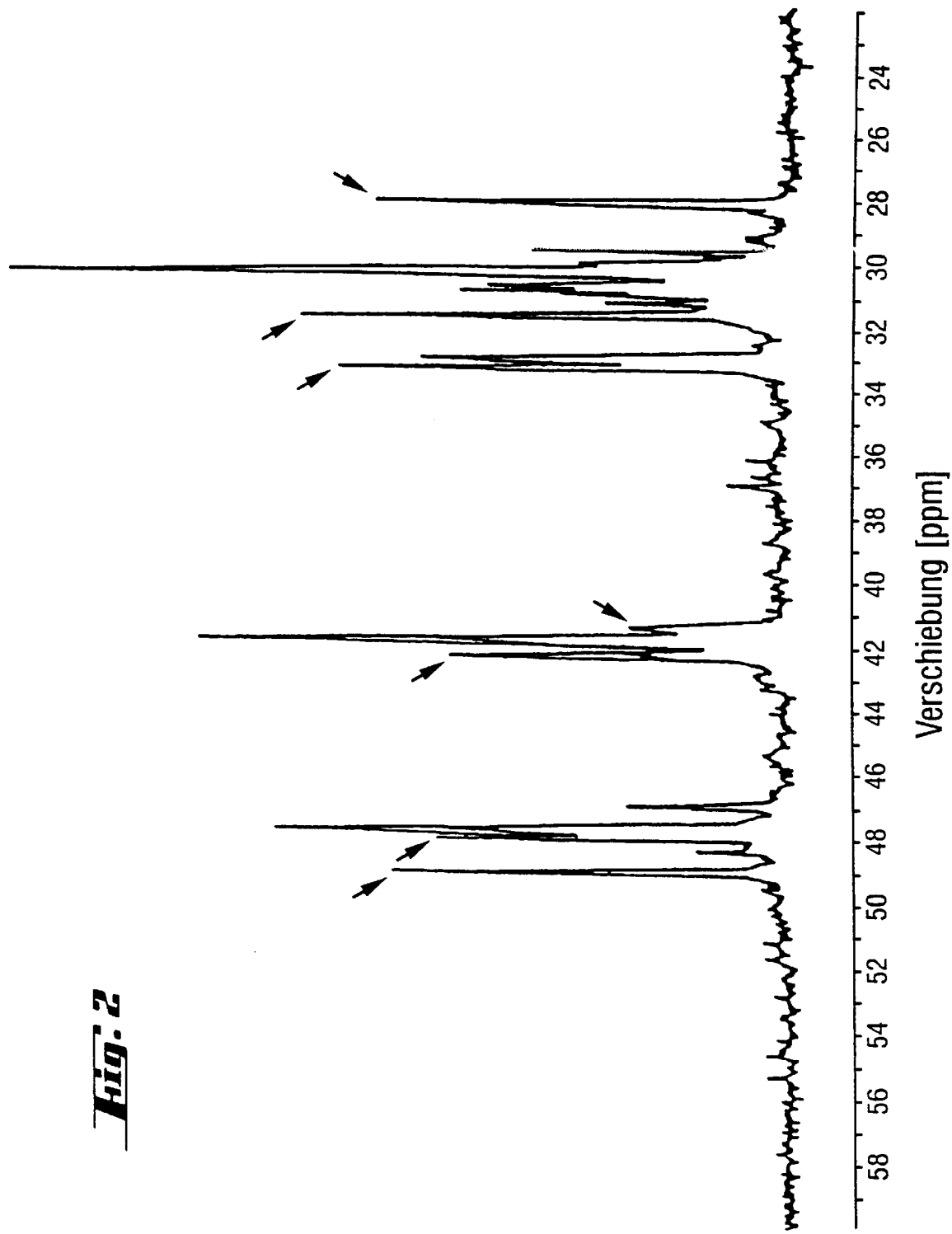
FIG. 2 shows a $^{13}$C-NMR spectrum of a cycloolefin copolymer of the type B having the microstructure characteristic for this type.

FIG. 2 shows a $^{13}$C-NMR spectrum of a cycloolefin copolymer of the type B having the microstructure characteristic for this type.

The spectra have some peaks in common and some differences which are probably attributable to the different steric structure of the polymers ("tacticity"). The specific microstructure of the cycloolefin copolymer of the type A gives some characteristic peaks which are shown in Table 1:

TABLE 1

| Peaks in common (ppm) | Characteristic peaks of the type A (ppm) |
|---|---|
| 47.5 | 49.8 |
| 46.8 | |
| 41.7 | 40.8 |
| 32.8 | 33.3 |
| 30.1 | 29.3 |

Since the position of the individual peaks can vary somewhat depending on the conditions under which the spectra are recorded, the peaks common to all spectra can serve as reference points. The heights of the respective peaks vary with monomer composition, but the positions are characteristic. Unambiguous indications of the microstructure of the invention are the peaks at 29.3, 33.3, 40.8 and 49.8 ppm. (The peaks mentioned are characteristic of the specific microstructure, but the spectra generally also include other peaks). Additives or impurities can lead to additional peaks in a spectrum. Spectra of the polymers to be used according to the invention can therefore also contain additional peaks.

The specific microstructure of the cycloolefin copolymer of the type B produces some characteristic peaks in the $^{13}$C-NMR spectrum. FIG. 2 shows a typical spectrum of cycloolefin copolymers of norbomene and ethylene having the specific microstructure; FIG. 1 shows, for comparison, a spectrum of a cycloolefin copolymer without the characteristic microstructure. The spectra have some peaks in common and differences which are probably attributable to a different steric structure of the polymers ("tacticity"). The specific microstructure gives some characteristic peaks which are shown in Table 2. The peaks common to FIG. 1 and FIG. 2 are likewise shown in Table 2.

TABLE 2

| Peaks in common (ppm) | Characteristic peaks of the type B (ppm) |
|---|---|
| 47.5 | 49.8 |
| 46.8 | 47.7 |
| 41.7 | 42.2 |
| | 41.3 |

TABLE 2-continued

| Peaks in common (ppm) | Characteristic peaks of the type B (ppm) |
|---|---|
| 32.8 | 33.1 |
| 30.1 | 31.5 |
|  | 28.0 |

Since the position of the individual peaks can vary somewhat depending on the conditions under which the spectra are recorded, the peaks common to all spectra can serve as reference points. The heights of the respective peaks vary with monomer composition, but the positions are characteristic. Unambiguous indications of the characteristic microstructure are the peaks at 28.0, 31.5, 33.1, 41.3, 42.2, 47.7 and 48.8 ppm. (The peaks mentioned are characteristic of the specific microstructure, but the spectra generally also include other peaks). Additives or impurities can lead to additional peaks in a spectrum. Spectra of the polymers to be used according to the invention can therefore also contain additional peaks.

Figure 3:
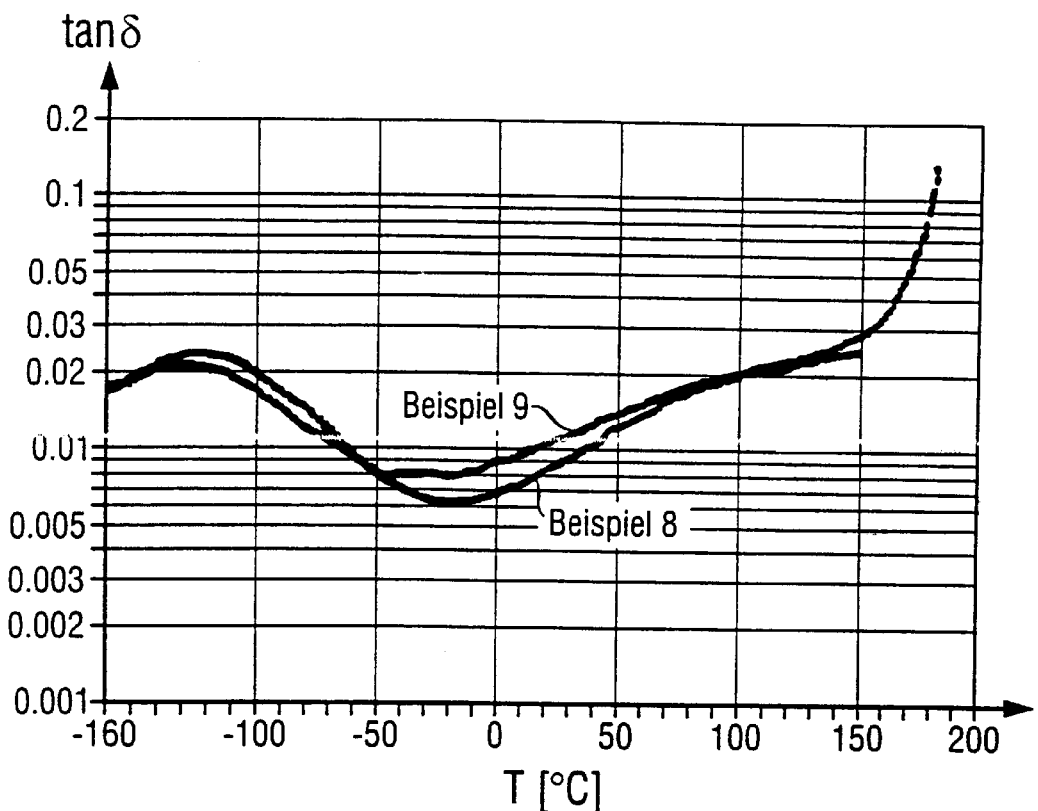
FIG. 3 shows temperature dependence of the mechanical tan δ of polymers with and without the characteristic microstructure of the type B cycloolefin copolymer.
Figure 4:
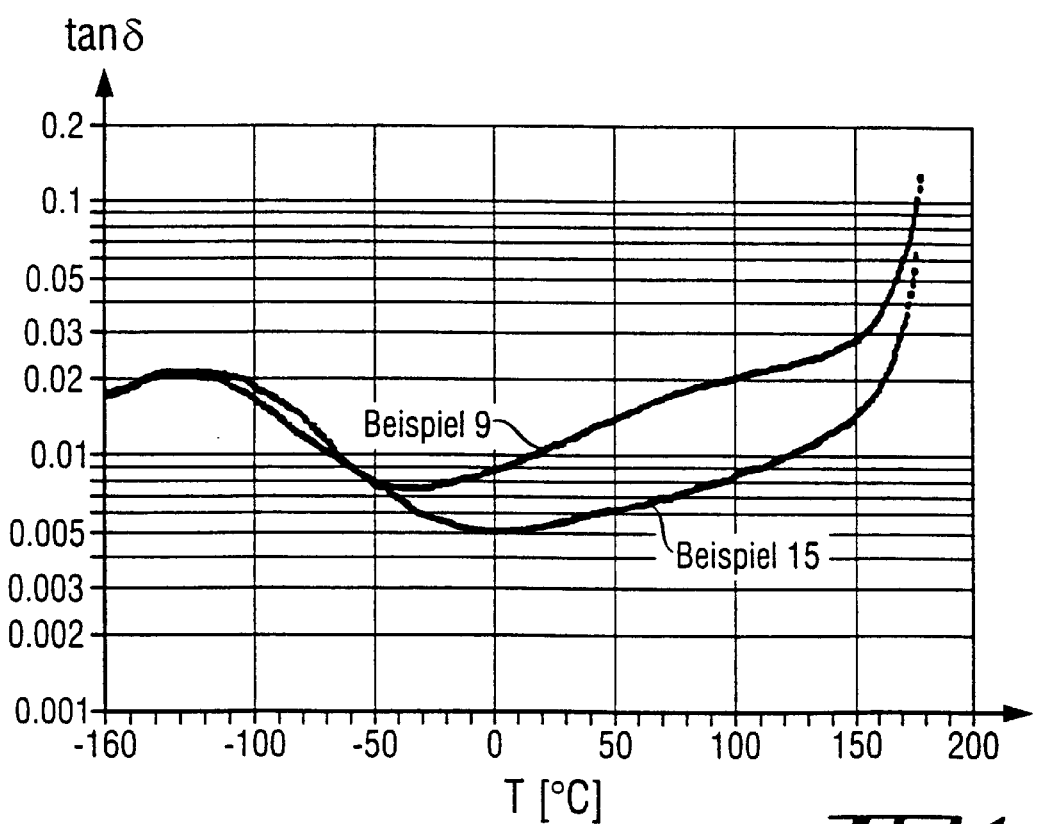
FIG. 4 shows temperature dependence of the mechanical tan δ of polymers with and without the characteristic microstructure of the type B cycloolefin copolymer.

FIG. 3 and FIG. 4 show the temperature dependence of the mechanical tan δ of polymers with and without the characteristic microstructure of the cycloolefin copolymers of the type B. The polymers having the characteristic microstructure display higher values in the range from the glass transition temperature to below 0° C. The samples having the characteristic microstructure therefore have an improved ductility in this temperature range.

Figure 5:
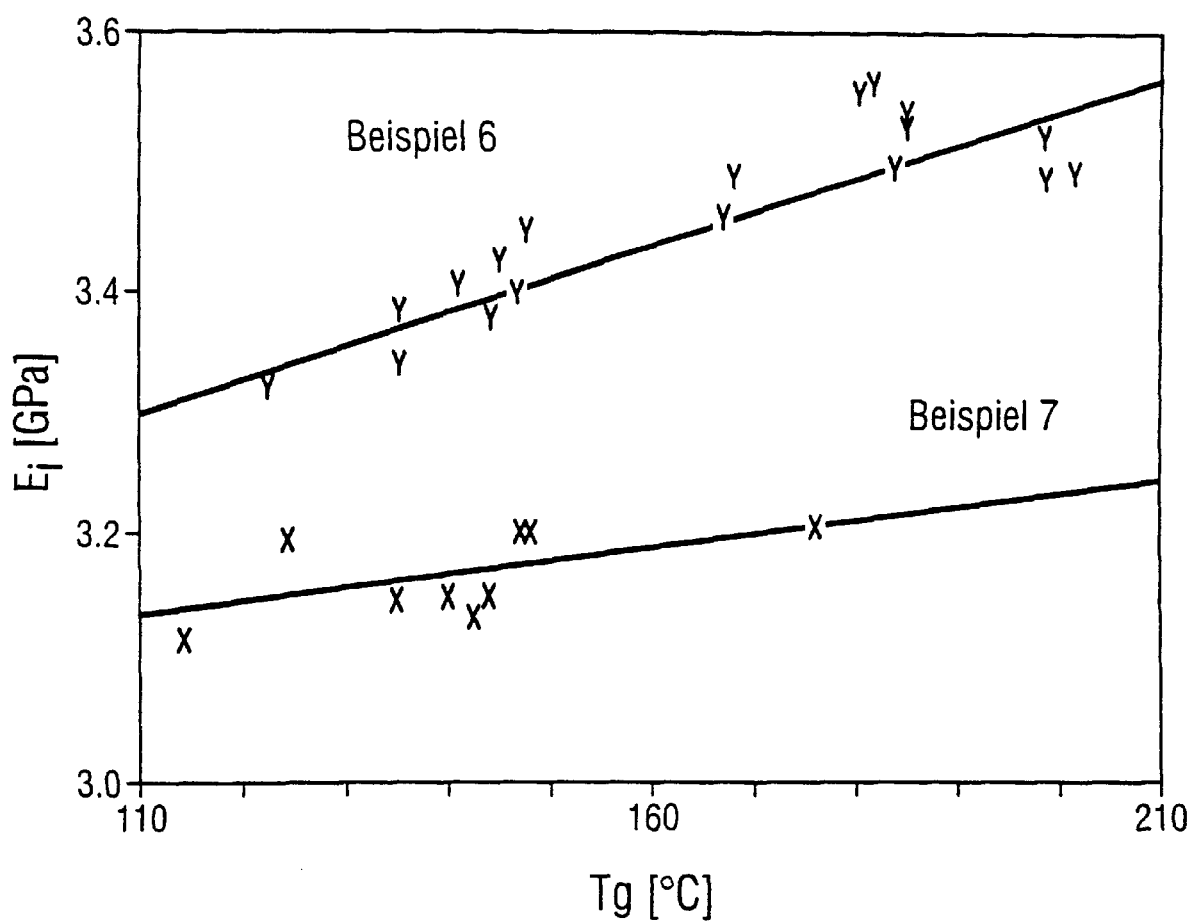
FIG. 5 shows the tensile E modulus as a function of the glass transition temperature for polymers with and without the characteristic microstructure of the type A cycloolefin copolymer.
Figure 6:
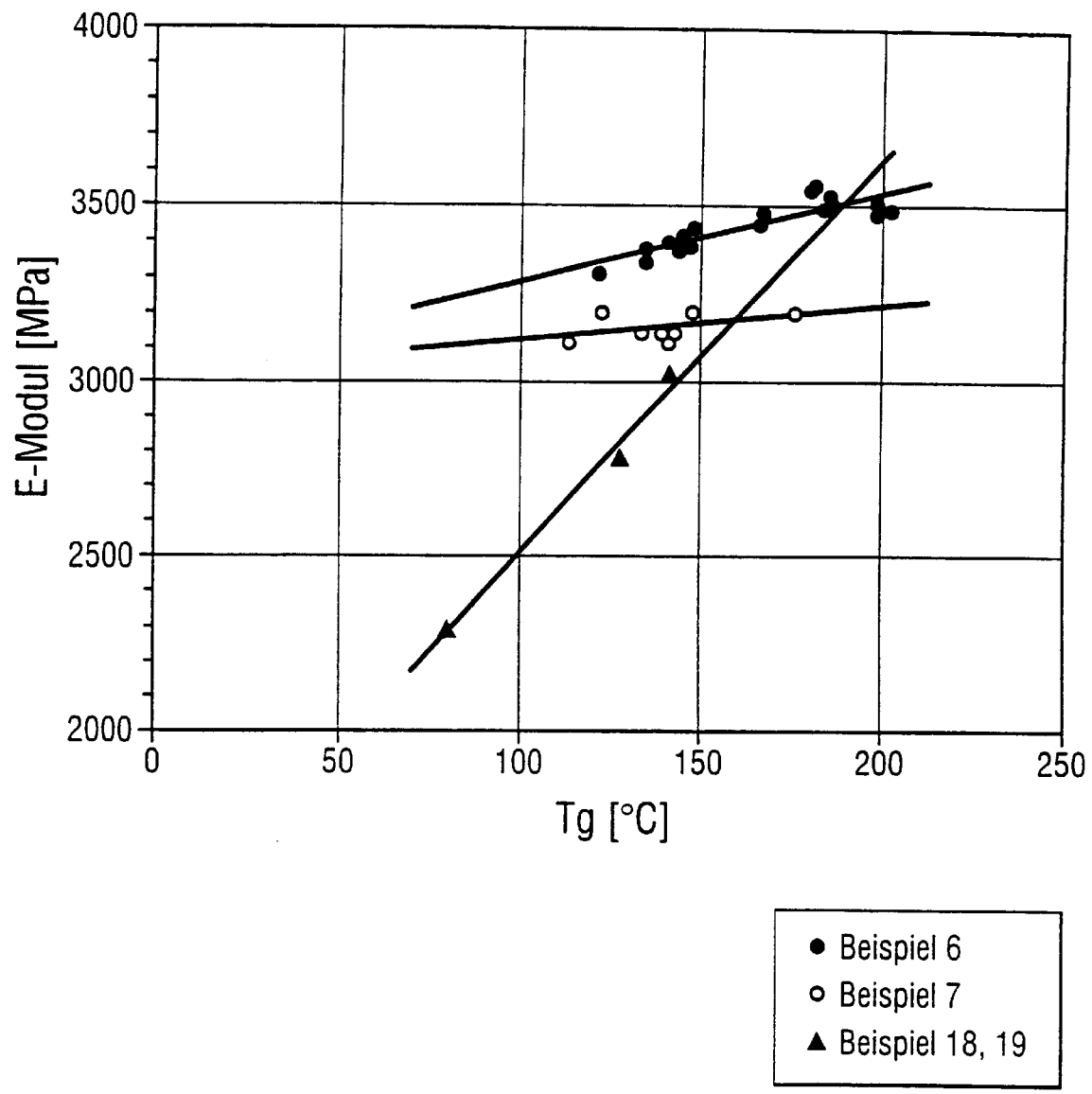
FIG. 6 shows the tensile E modulus as a function of the glass transition temperature for polymers with and without the characteristic microstructure of the type A cycloolefin copolymer.

FIG. 5 and FIG. 6 show the tensile E modulus as a function of the glass transition temperature for polymers with and without the characteristic microstructure of the cycloolefin copolymer of the type A.

Figure 7:
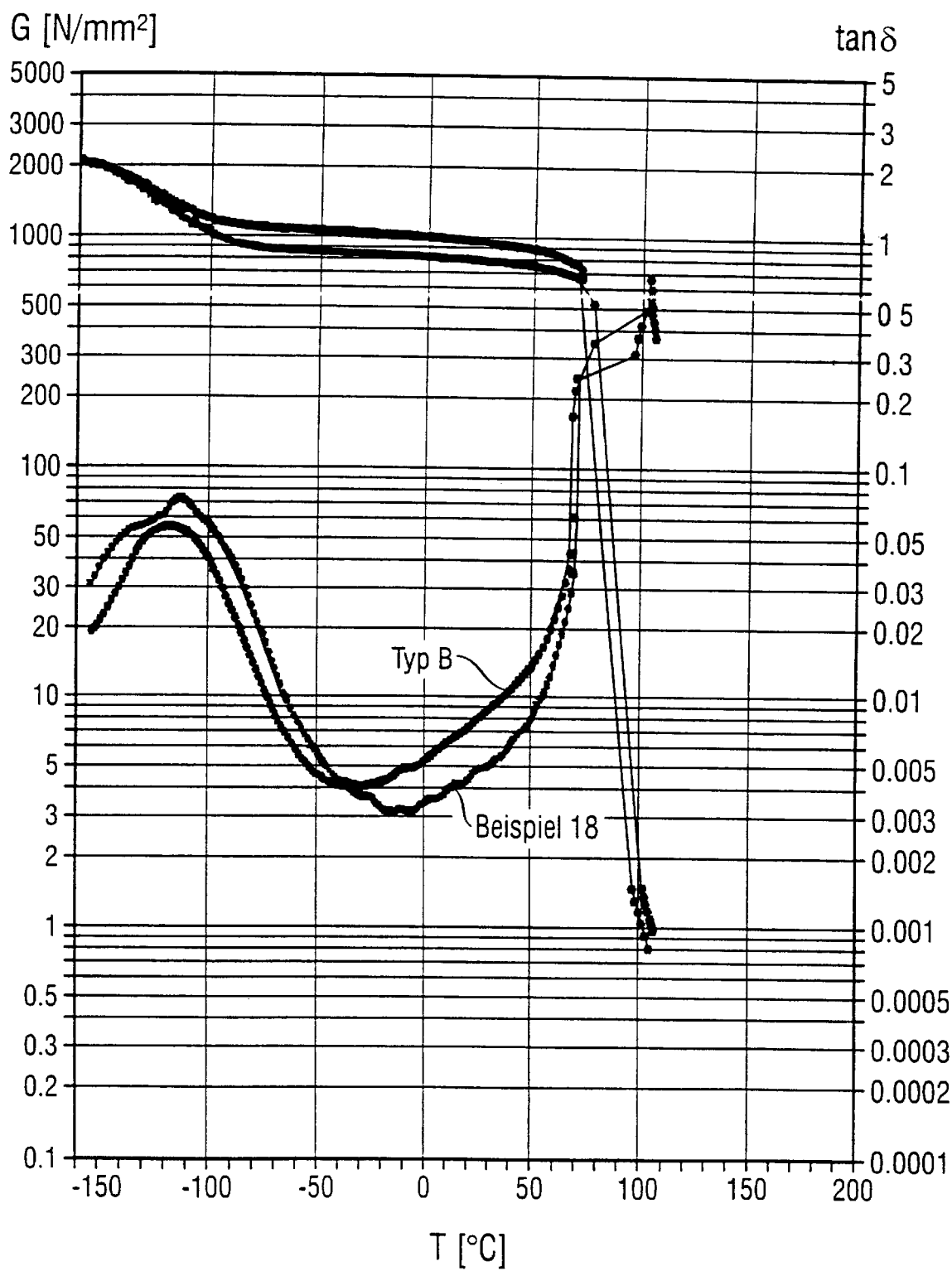
FIG. 7 shows the temperature dependence of the mechanical tan δ of polymers with and without the characteristic microstructure of the type B cycloolefin copolymers.
Figure 8:
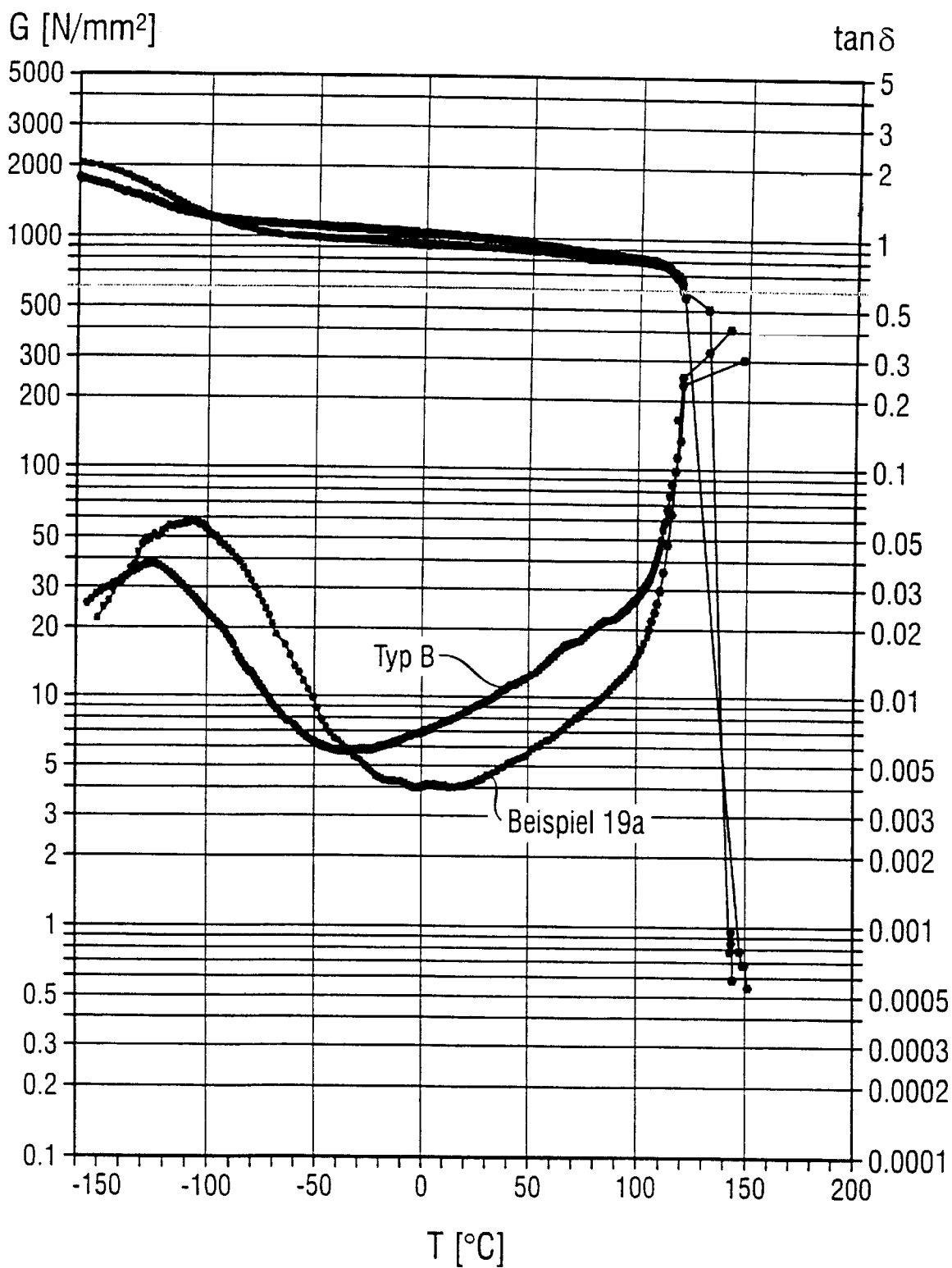
FIG. 8 shows the temperature dependence of the mechanical tan δ of polymers with and without the characteristic microstructure of the type B cycloolefin copolymers.
Figure 9:
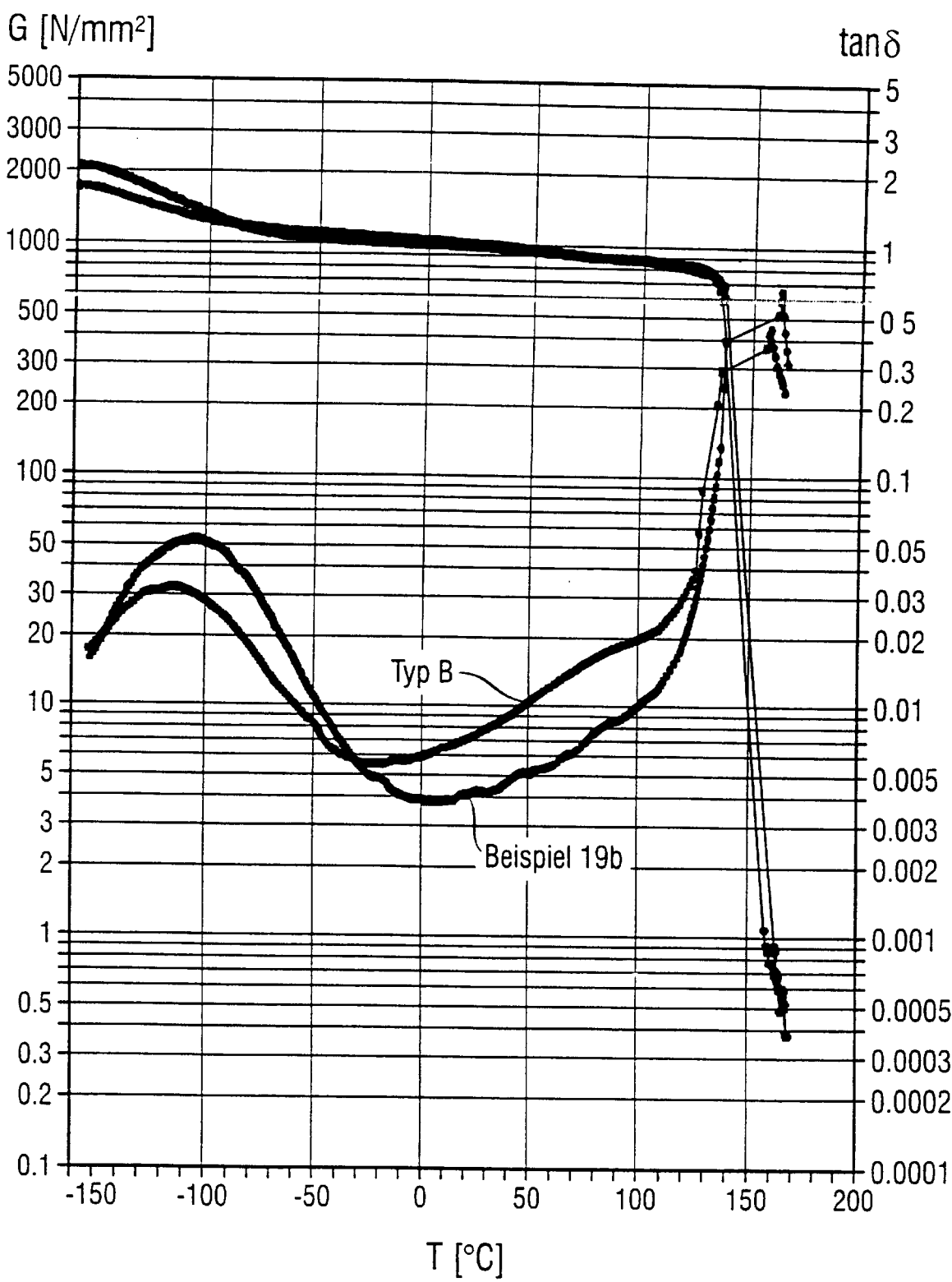
FIG. 9 shows the temperature dependence of the mechanical tan δ of polymers with and without the characteristic microstructure of the type B cycloolefin copolymers.

FIG. 7 to FIG. 9 show the temperature dependence of the mechanical tan δ of polymers with and without the characteristic microstructure of the cycloolefin copolymers of the type B. The polymers having the characteristic microstructure display higher values in the range from the glass transition temperature to below 0° C. The samples having the characteristic microstructure therefore have an improved ductility in this temperature range.

EXAMPLES

Example 1

Preparation of a Polymer Having the Microstructure Important According to the Invention for Producing Stiff Foams A 1.5 dm³ autoclave which had previously been thoroughly flushed with ethene was charged with 600 cm³ of an 85% strength by weight solution of norbornene in toluene. The solution was saturated by repeated pressurization with ethene (6 bar). 5 cm³ of methylaluminoxane solution in toluene (10.1% strength by weight methylaluminoxane solution having a molar mass of 1300 g/mol according to cryoscopic determination) were metered in counter-current into the reactor thus prepared and the mixture was stirred for 30 minutes at 70° C. A solution of 0.16 mg of isopropylene (cyclopentadienyl)-(9-fluorenyl)zirconium dichloride in 5 cm³ of methylaluminoxane solution in toluene was added after preactivation for 15 minutes. (In the case of hydrogen regulation, hydrogen can be injected at this point.) Polymerization was carried out for one hour while stirring (750 rpm), with the ethene pressure being maintained at 6 bar by metering in further amounts. After the end of the reaction time, the polymerization mixture was drained into a vessel and immediately introduced into 5 dm³ of acetone, stirred for 10 minutes and the precipitated product was subsequently filtered off. The filter cake was washed alternately with three portions of 10% strength hydrochloric acid and three portions of acetone.

Finally, the filter cake was washed with water until neutral, the residue was slurried in acetone and filtered again. The polymer thus purified was dried at 80° C. in vacuo (0.2 bar) for 15 hours.

23.5 g of the product were obtained at an activity of 63,523 g/(mmol*h). The product had a glass transition temperature of 155° C., a viscosity number of 211 cm³/g and a molar mass distribution (GPC) of 2.3.

A ¹³C-NMR spectrum of a solution of the polymer in hexachlorobutadiene and tetrachloroethane-d₂ was recorded using a 400 MHz NMR instrument (Bruker AM 400). As shown in FIG. 1, the spectrum displays the characteristc peaks at 29.3, 33.3, 40.8 and 49.8 ppm.

Examples 2 to 5

Preparation of Further Polymers Having the Microstructure Important According to the Invention for the Production of Stiff Foams Using a method similar to Example 1, polymers having different glass transition temperatures were prepared. In Examples 4 and 6, diphenylmethylene(cyclopentadienyl)(9-fluorenyl)zirconium dichloride was used as metallocene catalyst. In these examples, hydrogen was injected to regulate the molar mass.

Table 3 summarizes the reaction conditions of Examples 2 to 5 which deviate from those of Example 1.

The peaks in the ¹³C-NMR spectrum at 29.3, 33.3, 40.8 and 49.8 ppm which are characteristic of the microstructure are also present here.

TABLE 3

| Example | Ethene pressure bar | Hydrogen mmol | Amount of metallocene mg | Time min | Yield g | Tg ° C. | VN cm³/g |
|---|---|---|---|---|---|---|---|
| 2 | 10 | — | 0.17 | 30 | 30.9 | 134 | 192 |
| 3 | 14 | — | 0.24 | 30 | 60.3 | 122 | 169 |
| 4 | 10 | 1.08 | 1.18 | 60 | 87.7 | 145 | 119 |
| 5 | 3 | 0.22 | 1.2 | 60 | 17 | 185 | 46 |

Example 6

Relationship between the $E_i$ values and the glass transition temperature for polymers having the microstructure important according to the invention for the production of stiff foams Further polymers having the specific microstructure and different glass transition temperatures were prepared as in Examples 1 to 6 using isopropylene(cyclopentadienyl)(9-fluorenyl)zirconium dichloride and diphenylmethylene (cyclopentadienyl)(9-fluorenyl)zicroniumdichloride, with the glass transition temperature being varied via the ratios in which norbornene and ethene were incorporated. The ¹³C-NMR spectra of all polymers displayed the characteristic peaks at 29.3, 33.3, 40.8 and 49.8 ppm. These polymers were melted and injection-molded to give tensile bars in accordance with DIN 53 457. The intrinsic E modulus values ($E_i$ values) were determined on these specimens. The glass transition temperatures ($T_g$) were likewise determined by means of DSC.

FIG. 5 shows the dependence of the $E_i$ values on the $T_g$ of the individual polymers. These polymers fulfill the relationship:

$E_i=(0.0025 [GPa/C] \times T_g[C])+B[GPa]$ where B=2.93–3.19.

Example 7 (Comparative example)
Relationship between the $E_i$ values and the glass transition temperature for polymers without the microstructure important according to the invention Further polymers having different glass transition temperatures but without the specific microstructure were prepared by a method similar to Examples 1 to 6 using rac-dimethylsilylbis(1indenyl)zirconium dichloride, with the glass transition temperature being varied via the ratios in which norbornene and ethene were incorporated. The $^{13}$C-NMR spectra of these polymers lacked the characteristic peaks at 29.3, 33.3, 40.8 and 49.8 ppm.

FIG. 5 shows the dependence of the $E_i$ values on the $T_g$ of the individual polymers.

These polymers have $E_i$ values distinctly below those given by the relationship:

$E_i=(0.0025 [GPa/C] \times T_g[C])+B[GPa]$ where B=2.93–3.19.

Example 8
Preparation of Polymers Having the Microstructure Important According to the Invention for the Production of Flexible Foams A 1.5 dm$^3$ autoclave which had previously been thoroughly flushed with ethene was charged with 600 cm$^3$ of an 85% strength by weight solution of norbornene in toluene. The solution was saturated by repeated pressurization with ethene (6 bar). 5 cm$^3$ of methylaluminoxane solution in toluene (10.1% strength by weight methylaluminoxane solution having a molar mass of 1300 g/mol according to cryoscopic determination) were metered in counter-current into the reactor thus prepared and the mixture was stirred for 30 minutes at 70° C. A solution of 1.2 mg of isopropylene (cyclopentadienyl)(1-indenyl)zirconium dichloride in 5 cm$^3$ of methylaluminoxane solution in toluene was added after preactivation for 15 minutes. (In the case of hydrogen regulation, hydrogen can be injected at this point.)

Polymerizationwas carried out for one hour while stirring (750 rpm), with the ethene pressure being maintained at 6 bar by metering in further amounts. After the end of the reaction time, the polymerization mixture was drained into a vessel and immediately introduced into 5 dm$^3$ of acetone, stirred for 10 minutes and the precipitated product was subsequently filtered off, The filter cake was washed alternately with three portions of 10% strength hydrochlorc acid and three portions of acetone.

Finally, the filter cake was washed with water until neutral, the residue was slurried in acetone and filtered again. The polymer thus purified was dried at 80° C. in vacuo (0.2 bar) for 15 hours.

44.8 g of the product were obtained at an activity of 14,278 g/(mmol*h). The product had a glass transition temperature of 179° C., a viscosity number of 73 cm$^3$/g and a molar mass distribution (GPC) of 2.0.

A $^{13}$C-NMR spectrum of a solution of the polymer in hexachlorobutadiene and tetrachloroethane-d$_2$ was recorded using a 400 MHz NMR instrument (Bruker AM 400). As shown in FIG. 2, the spectrum displays the characteristic peaks at 28.0, 31.5, 33.1, 41.3, 42.2, 47.7 and 48.8 ppm.

Examples 9 to 14
Preparation of Further Polymers Having the Microstructure Important According to the Invention for the Production of Flexible Foams Using a method similar to Example 8, polymers having different glass transition temperatures were prepared. In Example 9, dimethylsilylbis(1-indenyl)zirconium dichloride was used as metallocene catalyst. In Examples 10–12, isopropylenebis(1-indenyl)zirconium diculoride was used as metallocene catalyst. In Examples 13 and 14, isopropylenebis-(cyclopentadienyl)(1-indenyl)zirconium dichloride was used as metallocene catalyst.

Table 4 summarizes the reaction conditions of Examples 9 to 13 which deviate from those of Example 8.

The peaks in the $^{13}$C-NMR spectrum at 28.0, 31.5, 33.1, 41.3, 42.2, 47.7 and 48.8 ppm which are characteristic of the microstructure are also present here.

TABLE 4

| Example | Ethene pressure bar | Hydrogen mmol | Amount of metallocene mg | Time min | Yield g | Tg ° C. | VN cm$^3$g |
|---|---|---|---|---|---|---|---|
| 9 | 6 | — | 8 | 120 | 55 | 178 | 89 |
| 10 | 3 | — | 1.4 | 60 | 14.7 | 232 | 198 |
| 11 | 6 | — | 1.03 | 60 | 17.7 | 194 | 221 |
| 12 | 12 | 0.35 | 0.47 | 60 | 33.5 | 147 | 80 |
| 13 | 12 | — | 1.01 | 60 | 115 | 119 | 63 |
| 14 | 18 | — | 1.14 | 60 | 99.8 | 140 | 78 |

Example 15 (Comparative example)
Preparation of a Polymer Without the Microstructure Important According to the Invention Using a method similar to Example 8, a polymer without the microstructure important according to the invention was prepared. Diphenylmethylene(cyclopentadienyl)(9fluorenyl)zirconium dichloride was used as metallocene catalyst.

The reaction conditions deviating from those of Example 8 are summarized in Table 5.

TABLE 5

| Example | Ethene pressure bar | Hydrogen mmol | Amount of metallocene mg | Time min | Yield g | Tg ° C. | VN cm$^3$/g |
|---|---|---|---|---|---|---|---|
| 15 | 10 | 1.08 | 1.18 | 60 | 87.7 | 145 | 119 |

The peaks at 28.0, 31.5, 33.1, 41.3, 42.2, 47.7 and 48.8 ppm which are characteristic of the microstructure were absent in the $^{13}$C-NMR spectrum.

Example 16

The polymers from Examples 8 to 15 were pressed in a platen press at 250° C. to form plates having a thickness of 1 mm. Specimens having dimensions of 50 mm×10 mm were cut therefrom. The temperature dependence of the mechanical tan δ was determined using a torsional pendulum instrument (from Zwick). The results for Examples 8, 9 and 15 are shown in FIGS. 3 and 4.

Example 17
Preparation of a Polymer for the Production of Partially Crystalline Foams A 1.5 dm$^3$ autoclave which had previously been thoroughly flushed with ethene was charged with 600 cm$^3$ of an 85% strength by weight solution of norbornenein toluene. The solution was saturated by repeated pressurization with ethene (6 bar). 5 cm$^3$ of methylaluminoxane solution in toluene (10.1% strength by weight methylaluminoxane solution having a molar mass of 1300 g/mol according to cryoscopic determination) were metered in counter-current into the reactor thus prepared and the mixture was stirred for 30 minutes at 70° C. A solution of 0.16 mg of isopropylene (9-fluorenyl)(1-(3-methyl)cyclopentadienyl) zirconiumdichloride in 5 cm³ of methylaluminoxane solution in toluene was added after preactivation for 15 minutes. (In the case of hydrogen regulation, hydrogen can be injected at this point.)

Polymerization was carried out for one hour while stirring (750 rpm), with the ethene pressure being maintained at 6 bar by metering in further amounts. After the end of the reaction time, the polymerization mixture was drained into a vessel and immediately introduced into 5 dm³ of acetone, stirred for 10 minutes and the precipitated product was subsequently filtered off. The filter cake was washed alternately with three portions of 10% strength hydrochloric acid and three portions of acetone.

Finally, the filter cake was washed with water until neutral, the residue was slurried in acetone and filtered again. The polymer thus purified was dried at 80° C. in vacuo (0.2 bar) for 15 hours.

54 g of the product were obtained at an activity of 63,523 gI(mmol*h). The product had a glass transition temperature of 133° C., a melting point of 289° C. and a viscosity number of 131 cm³/g, The ratio of norbornene and ethylene incorporated is, according to the NMR spectrum, about 50 mol % of norbomene to 50 mol % of ethene.

Example 18

A random copolymer of ethylene and 1,4,5,8dimethano-1,2,3,4,4a,5,8,8a-octahydronaphthalene was prepared according to the method given in EP-A-384 693. The copolymer had a glass transition temperature of 79° C. and a viscosity number of 64 cm³/g.

The modulus of elasticity and the temperature dependence of tan δ were determined. The modulus of elasticity is shown in FIG. 6. The temperature dependence of tan δ is shown FIG. 7 in comparison with that of a copolymer of the type B having a comparable glass transition temperature.

Example 19

Further copolymers were prepared using the method of Example 18. The glass transition temperatures and viscosity numbers are summarized in Table 6. The moduli of elasticity are shown in FIG. 6. The temperature dependence of tan δ is shown in FIG. 8 and 9, in each case in comparison with that of a copolymer of the type B having a comparable glass transition temperature.

TABLE 6

| Example | T$_\delta$ ° C. | VN cm³/g | E modulus MPa | tan$_g$ |
|---------|-----------------|----------|---------------|---------|
| 18      | 79              | 64       | 2294          | FIG. 7  |
| 19a     | 124             | 55       | 2785          | FIG. 8  |
| 19b     | 140             | 68       | 3015          | FIG. 9  |

Example 20
Foaming by Thermoplastic Foam Extrusion

A norbornene-ethene copolymer of the type A, prepared using isopropylene-(cyclopentadienyl)(9-fluorenyl) zirconium dichloride and having a glass transition temperature of 135° C. and a viscosity number of 110 ml/g, was mixed in a tumble mixer with 2% by weight of the blowing agent Hydrocerol HP 40 P (from Boehringer Ingelheim) and dried for 12 hours at 80° C. and 0.2 bar.

The mixture was extruded in a single-screw extruder at a composition temperature of 240° C. and different rotational speeds. This gave a foam which is white and has a smooth, glossy surface. Microscopic examination showed that it was a closed-pored foam having different cell sizes. The results are summarized in Table 7.

Example 21
Foaming by Thermoplastic Foam Extrusion

A norbornene-ethene copolymer of the type A, prepared using isopropylene-(cyclopentadienyl)(9-fluorenyl) zirconium dichloride and having a glass transition temperature of 135° C. and a viscosity number of 110 ml/g, was mixed in a tumble mixer with 4% by weight of the blowing agent Hydrocerol HP 40 P (from Boehringer Ingelheim) and dried for 12 hours at 80° C. and 0.2 bar.

The mixture was extruded in a single-screw extruder at a composition temperature of 240° C. and different rotational speeds. This gave a foam which is white and has a smooth, glossy surface. Microscopic examination showed that it was a closed-pored foam having different cell sizes. The results are summarized in Table 7.

TABLE 7

| Example | Proportion of blowing agent % by weight | Rotational speed rpm | Remarks | average cell diameter |
|---------|----|-----|-------------------------------------|---------------|
| 20      | 2  | 100 | white extrudate, diameter ca. 0.6–0.7 mm | ca. 40        |
| 20      | 2  | 150 | white extrudate, diameter ca. 0.8 mm | ca. 60–80     |
| 20      | 2  | 200 | white extrudate, diameter ca. 0.85 mm | ca. 80–100    |
| 21      | 4  | 100 | white extrudate, diameter ca. 0.7–0.8 mm | ca. 100       |
| 21      | 4  | 150 | white extrudate, diameter ca. 0.8–0.9 mm | ca. 100–150   |
| 21      | 4  | 200 | white extrudate, diameter ca. 0.75–0.85 mm | ca. 200       |

Example 22
Foaming by Thermoplastic Foam Extrusion

A norbomene-ethene copolymer of the type A was mixed with 2% by weight of the blowing agent Hydrocerol HP 40 P (from Boehringer Ingelheim). The norbornene-ethene copolymer was prepared using isopropylene (cyclopentadienyl)(9-fluorenyl)zirconium dichloride and had a glass transition temperature of 135° C. and a viscosity number of 110 ml/g. The material was extruded in a single-screw extruder at a composition temperature of 240° C. through a wide-slot die.

Plates of a closed-pored foam having thicknesses of 1 mm and 2 mm were produced.

The temperature profiles and the densities and shapes of the plates produced are shown in Table 8 below.

TABLE 8

| Example | Temperature profile [° C.] | Density [kg/m³] | Pores |
|---------|----------------------------|-----------------|-------|
| 22 a    | 200 (zone 1) 240 (zone 2–4) 230 (die) | 570 | closed-celled, Ø 50–100 μm |
| 22 b    | 200 (zone 1) 240 (zone 2,3) | 600 | closed-celled, Ø 20–150 μm |

TABLE 8-continued

| Example | Temperature profile [° C.] | Density [kg/m³] | Pores |
|---|---|---|---|
| 22 c | 230 (zone 4) 220 (die) 200 (zone 1) 240 (zone 2) 230 (zone 3) 220 (zone 4) 200 (die) | 580 | closed-celled, Ø 50–150 μm |

Example 23
Foaming by Thermoplastic Foam Injetion Molding

A cycloolefin copolymer was prepared as described in Example 20 and mixed with 2% by weight of Hydrocerol HP 40 P. The material was processed using an injection molding machine with a temperature profile of 25° C. (inlet)/200° C./210° C./240° C./230° C./240° C. (die head). The mold temperature was 70° C. and a plate mold having an area of 8 mm×12 mm and variable thickness was used. The thicknesses, densities and pore structures of the plates produced are shown in Table 9 below.

TABLE 9

| Example Plates | Thickness [mm] | Density [kg/m³] | Pore structure/distribution |
|---|---|---|---|
| 23 a | 4 mm | 715 kg/m³ | closed-celled, noncellular surface layer |
| 23 b | 4 mm | 793 kg/m³ | closed-celled, noncellular surface layer |
| 23 c | 4 mm | 885 kg/m³ | closed-celled, noncellular surface layer |
| 23 d | 8 mm | 743 kg/m³ | closed-celled, integral foam |
| 23 e | 8 mm | 817 kg/m³ | closed-celled, integral foam |
| 23 f | 20 mm | 737 kg/m³ | closed-celled, integral foam |
| 23 g | 20 mm | 651 kg/m³ | closed-celled, integral foam |
| 23 h | 20 mm | 520 kg/m³ | closed-celled, integral foam |
| 23 i | 20 mm | 410 kg/m³ | closed-celled, integral foam Ø 40–200 μm |

What is claimed is:

1. A foam comprising a polymer wherein the polymer comprises a homopolymer of any one of monomers (I) to (VI) or a copolymer of any one of monomers (I) to (VI) and (VII) or a copolymer of any one of monomers (I) to (VI) and (VIII), or a terpolymer of any one of monomers (I) to (VI) and (VII) and (VIII), wherein said polymer is produced by polymerization in the presence of a metallocene catalyst, the monomers are of the formula I, II, III, IV, V, VI, VII, and VIII as follow:

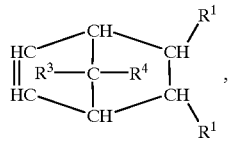
(I)

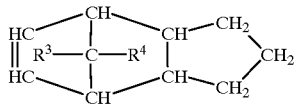
(II)

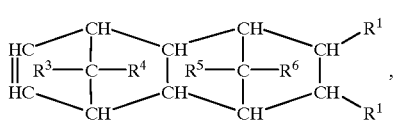
(III)

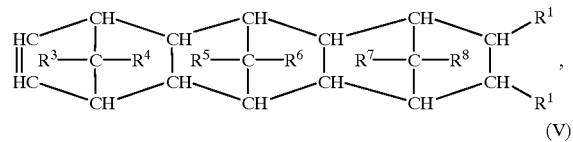
(IV)

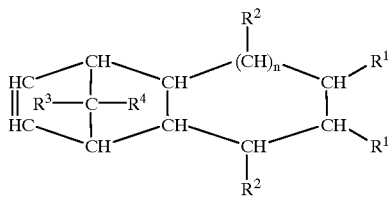
(V)

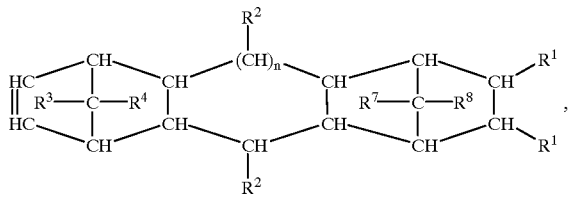
(VI)

where $R^1$, $R^2$, $R^3$, $R^4$, $R^5$, $R^6$, $R^7$, and $R^8$ are identical or different and are each a hydrogen atom, a linear or branched, saturated or unsaturated $C_1$–$C_{20}$-alkyl radical, $C_6$–$C_{18}$-aryl radical, $C_7$–$C_{20}$-alkylenearyl radical, a cyclic or acyclic $C_2$-$C_{20}$-alkenyl radical, or form a saturated, unsaturated or aromatic ring, where the same radicals $R^1$ to $R^8$ in the various formulae I to VI can have different meanings, where n is an integer from 0 to 5, and from 0 to 99.9% by weight, based on the total mass of the cycloolefin copolymer, of polymerized units which are derived from one or more acyclic olefins of the formula VII

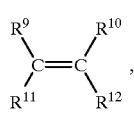
(VII)

where $R^9$, $R^{10}$, $R^{11}$ and $R^{12}$ are identical or different and are each a hydrogen atom, a linear, branched, saturated or unsaturated $C_1$–$C_{20}$-hydrocarbon radical or a $C_6$–$C_{18}$-aryl radical, and from 0 to 99.9% by weight, based on the total mass of the cycloolefin copolymer, of polymerized units of one or more monocyclic olefins of the formula VIII

(VIII)

where n is a number from 2 to 10.

2. A foam as claimed in claim 1 comprising at least one cycloolefin copolymer which comprises from 0.1 to 100% by weight, based on the total mass of the cycloolefin copolymer, of polymerized units which are derived from one or more polycyclicolefins of the formulae I, II, III, IV, V or VI,

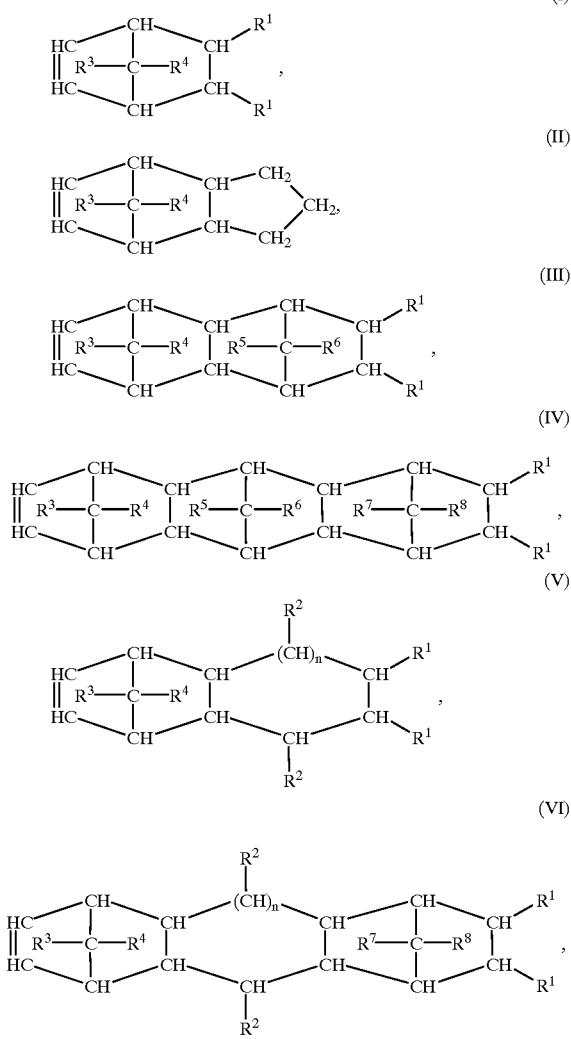

(I)

(II)

(III)

(IV)

(V)

(VI)

where $R^1$, $R^2$, $R^3$, $R^4$, $R^5$, $R^6$, $R^7$ and $R^8$ are identical or different and are each a hydrogen atom, a linear or branched, saturated or unsaturated $C_1$–$C_{20}$-alkyl radical, $C_6$–$C_{18}$-aryl radical, $C_7$–$C_{20}$-alkylenearyl radical, a cyclic or acyclic $C_2$–$C_{20}$-alkenyl radical, or form a saturated, unsaturated or aromatic ring, where the same radicals $R^1$ to $R^8$ in the various formulae I to VI can have different meanings, where n is an integer from 0 to 5, and from 0 to 99.9% by weight, based on the total mass of the cycloolefin copolymer, of polymerized units which are derived from one or more acyclic olefins of the formula VII

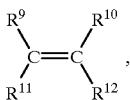

(VII)

where $R^9$, $R^{10}$, $R^{11}$ and $R^{12}$ are identical or different and are each a hydrogen atom, a linear, branched, saturated or unsaturated $C_1$–$C_{20}$-hydrocarbon radical or a $C_6$–$C_{18}$-aryl radical, and from 0 to 99.9% by weight, based on the total mass of the cycloolefin copolymer, of polymerized units of one or more monocyclicolefins of the formula VIII

(VIII)

where n is a number from 2 to 10.

3. A foam as claimed in claim 1 containing one or more voids which can contain one or more gaseous substances.

4. A foam as claimed in claim 1, comprising at least one cycloolefin copolymer which comprises from 20 to 99% by weight of polymerized units derived from polycyclic olefins of the formulae I, II, III, IV, V or VI and from 5 to 80% by weight of polymerized units derived from acyclic olefins of the formula VII.

5. A foam as claimed in claim 1, comprising at least one cycloolefin copolymer which comprises polymerized units which can be derived from polycyclic olefins of the formulae I or III, and polymerized units which can be derived from acyclic olefins of the formula VII.

6. A foam as claimed in claim 1, comprising at least one cycloolefin copolymer which contains polymerized units which can be derived from norbornene and ethylene.

7. A foam as claimed in claim 1, comprising at least one crosslinked cycloolefin copolymer.

8. A foam as claimed in claim 1, wherein the cycloolefin copolymer has a glass transition temperature of from 50 to 300° C., preferably from 70 to 250° C.

9. A foam as claimed in claim 1, wherein the cycloolefin copolymer has viscosity numbers of from 50 to 300 $cm^3/g$, preferably from 60 to 200 $cm^3/g$.

10. A foam as claimed in claim 1, wherein the cycloolefin copolymer has a tensile E modulus of >3000 Mpa.

11. A foam as claimed in claim 1, wherein the cycloolefin copolymer has a mechanical loss factor tan δ of >0.014, preferably >0.016, at 30° C. below the glass transition temperature.

12. A foam as claimed in claim 1, wherein the cycloolefin copolymer has a melting point of >200° C.

13. A foam as claimed in claim 1, wherein foaming is carried out using one or more blowing agents in a proportion of from 0.01 to 20% by weight, preferably from 0.1 to 10% by weight.

14. A foam as claimed in claim 1, wherein blowing agents used are one or more solid or liquid substances which liberate gases by decomposition, reaction or vaporization and/or one or more gases.

15. A foam as claimed in claim 1, wherein from 0.01 to 20% by weight, preferably from 0.1 to 10% by weight, of one or more nucleating agents are used in the foaming procedure.

16. A foam as claimed in claim 1, wherein from 0.01 to 80% by weight, preferably from 0.05 to 20% by weight, of one or more additives are used in the foaming procedure.

17. A foam as claimed in claim 1, wherein a certain part of the cycloolefin copolymer is replaced by the same proportion by weight of a foreign polymer and the proportion by weight is from 0 to 90% by weight, preferably from 0 to 50% by weight.

18. A foam as claimed in claim 17, wherein at least one polyter such as polypropylene, polypropylene copolymer or polyethylene is used as foreign polymer.

19. A process for producing a foam which comprises foaming at least one cycloolefin copolymer with at least one blowing agent.

20. A method of using the foam according to claim 1, wherein the foam can be used for the production of plates, films, hoses, tubes, rods, bands and containers.

21. A method of using the foam according to claim 1, wherein the foam can be used for producing extruded shaped parts, blow-molded parts, injection-molded parts and mold-foamed parts.

22. A method of using the foam according to claim 1, wherein the foam can be used for producing shaped parts from prefoamed beads or particles.

23. A method of using the foam according to claim 1, wherein the foam can be used as constituent of a composite material.

24. A method of using the foam according to claim 1, wherein the foam can be used in the automobile, building, transport, packaging and insulation sectors.

* * * * *